United States Patent Office.

J. T. MULKEY, OF WALTON'S FORD, GEORGIA.

Letters Patent No. 100,057, dated February 22, 1870.

IMPROVED OINTMENT FOR BRUISES, BURNS, &c.

The Schedule referred to in these Letters Patent and making part of the same.

*To all whom it may concern:*

Be it known that I, J. T. MULKEY, of Walton's Ford, in the county of Habersham, and State of Georgia, have invented a new and useful Improvement in Medical Compound; and I do hereby declare that the following is a full, clear, and exact description thereof, which will enable others skilled in the art to make and use the same.

This invention relates to a new and useful medical compound for the cure of burns, bruises, and cutaneous diseases; and consists in combining the ingredients hereinafter named in the manner specified.

In carrying out my invention and discovery, I procure a vegetable substance botanically known as "*fegatella conica*," a kind of moss or lichen which grows spontaneously in the southern States. To one pound of this *fegatella* I add five pounds of good hog's lard. When thus mixed together I melt the lard and heat the compound over a slow fire without raising its temperature to the boiling point.

When the composition is sufficiently heated and the ingredients are thorougly incorporated together, it is strained through a suitable cloth, and when cool it is ready for use.

The curative properties of the *fegatella* were discovered by myself. By experimenting therewith I have found that when combined with lard so as to form a paste or ointment it is an invaluable remedy for diseases of the skin, as well as for wounds, burns, cuts, and bruises of the flesh. It is applied spread on thin cloth to the wounded or affected part, when the healing process commences immediately.

Having thus described my invention,

I claim as new, and desire to secure by Letters Patent—

The compound herein described, formed of the ingredients and in the proportions mentioned, substantially as and for the purpose set forth.

The above specification of my invention signed by me this 5th day of October, 1869.

J. T. MULKEY.

Witnesses:
C. K. JARRETT,
LITTLETON EDGE.